US011354488B2

(12) United States Patent
Delozanne

(10) Patent No.: US 11,354,488 B2
(45) Date of Patent: Jun. 7, 2022

(54) METHOD FOR CREATING INTERACTIVE DIGITAL DOCUMENTS

(71) Applicant: Universite de L'Ingenierie, Saint-Denis la Plaine (FR)

(72) Inventor: Sylvain Delozanne, Reims (FR)

(73) Assignee: Universite de L'Ingenierie, Saint-Denis la Plaine (FR)

( * ) Notice: Subject to any disclaimer, the term of this patent is extended or adjusted under 35 U.S.C. 154(b) by 0 days.

(21) Appl. No.: 17/295,820

(22) PCT Filed: Nov. 15, 2019

(86) PCT No.: PCT/FR2019/052726
§ 371 (c)(1),
(2) Date: May 20, 2021

(87) PCT Pub. No.: WO2020/104743
PCT Pub. Date: May 28, 2020

(65) Prior Publication Data
US 2022/0027554 A1    Jan. 27, 2022

(30) Foreign Application Priority Data

Nov. 23, 2018 (FR) ..................... 1871760

(51) Int. Cl.
*G06F 40/134* (2020.01)
*G06F 40/14* (2020.01)

(52) U.S. Cl.
CPC ............ *G06F 40/134* (2020.01); *G06F 40/14* (2020.01)

(58) Field of Classification Search
CPC ............................ G06F 40/134; G06F 40/14
See application file for complete search history.

(56) References Cited

FOREIGN PATENT DOCUMENTS

| EP | 2595072 A1 | 5/2013 |
|----|------------|--------|
| FR | 3020162 | 10/2015 |
| WO | 2016/024987 | 2/2016 |

OTHER PUBLICATIONS

International Search Report for International Application No. PCT/FR2019/052726 dated Mar. 25, 2020, 2 pages.
International Written Opinion for International Application No. PCT/FR2019/052726 dated Mar. 25, 2020, 7 pages.

*Primary Examiner* — Asher D Kells
(74) *Attorney, Agent, or Firm* — TraskBritt

(57) ABSTRACT

A method for creating interactive digital documents involves creating and saving an initial digital file of the HTML type, comprising a display page structure having a first graphical form and a plurality of scripts, each of which is activatable by a hypertext link.

4 Claims, 2 Drawing Sheets

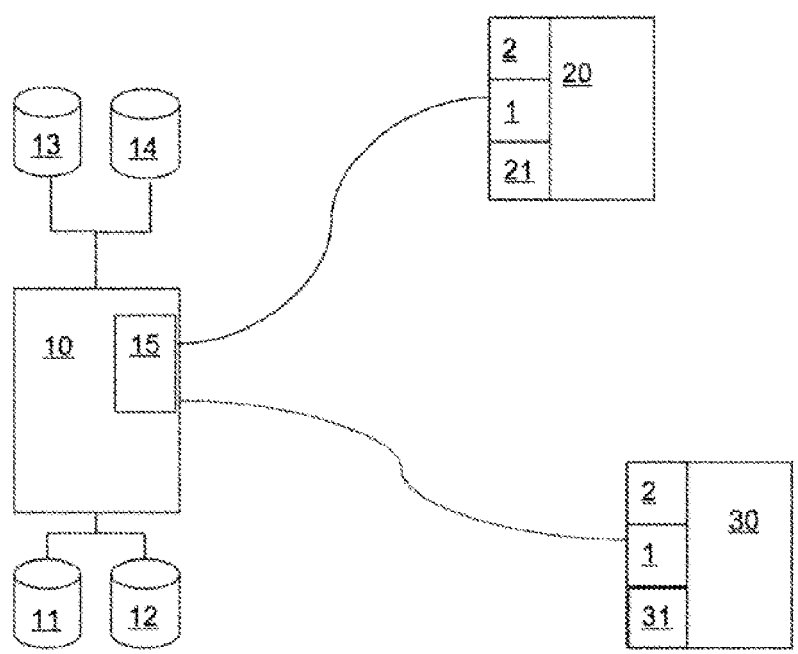
[Fig. 1]
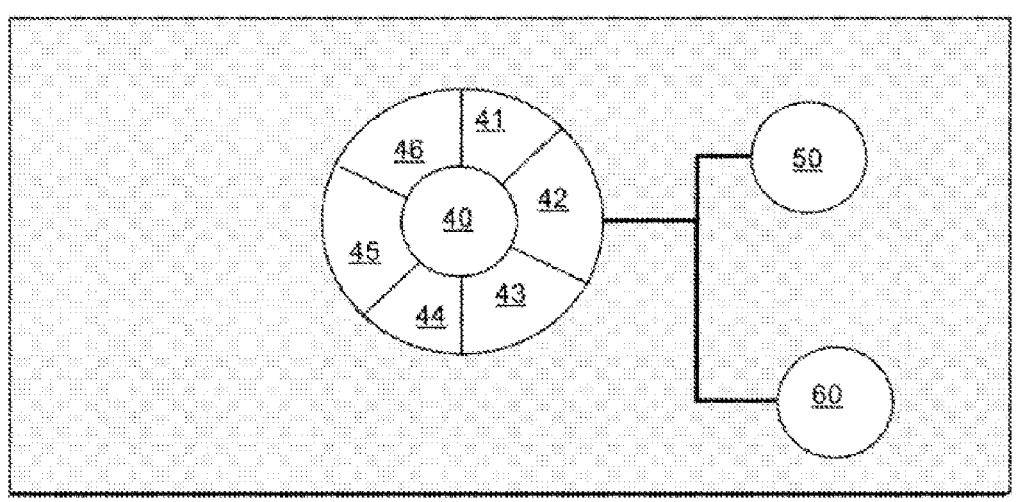
[Fig. 2]

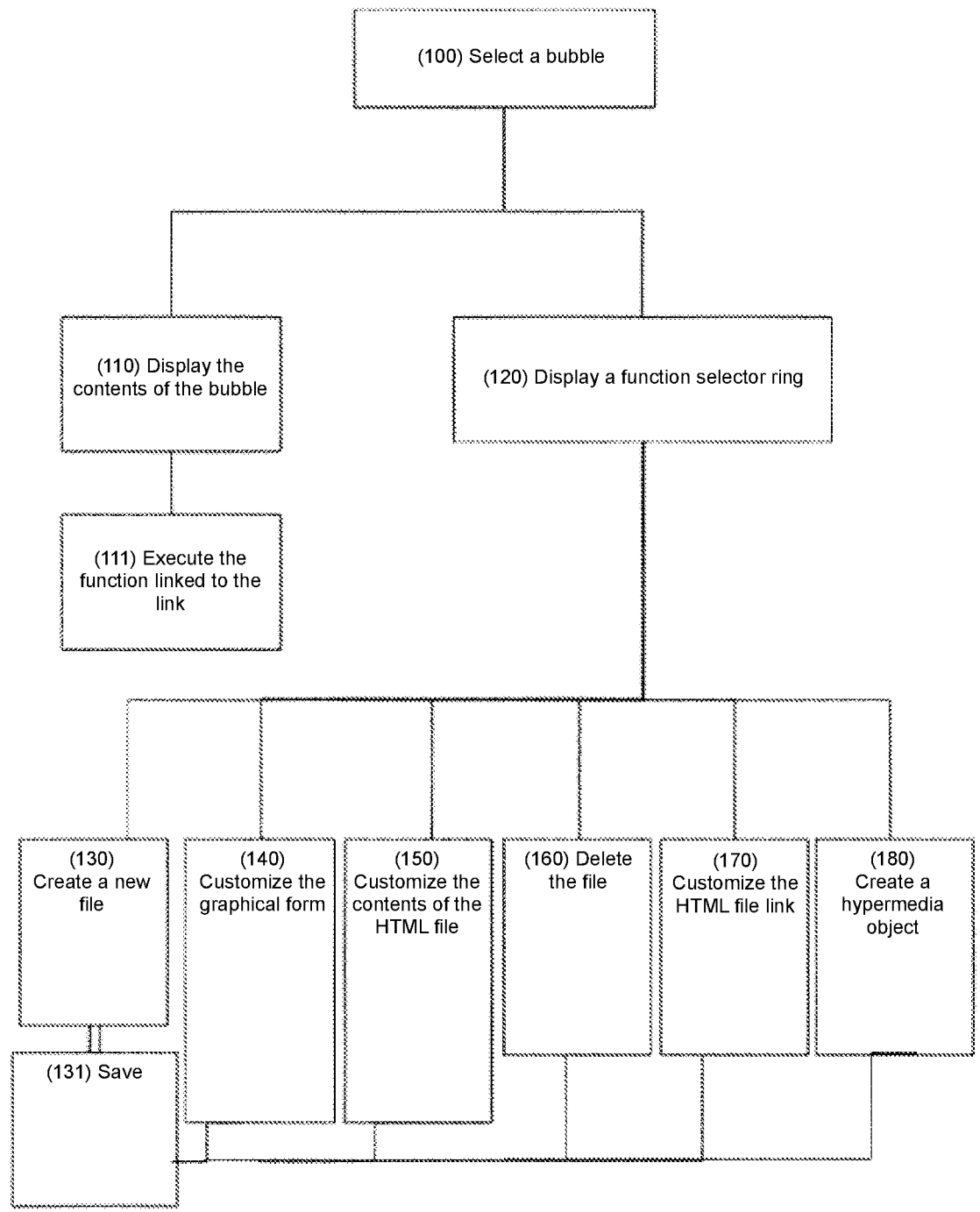

METHOD FOR CREATING INTERACTIVE DIGITAL DOCUMENTS

CROSS-REFERENCE TO RELATED APPLICATIONS

This application is a national phase entry under 35 U.S.C. § 371 of International Patent Application PCT/FR2019/052726, filed Nov. 15, 2019, designating the United States of America and published as International Patent Publication WO 2020/104743 A1 on May 28, 2020, which claims the benefit under Article 8 of the Patent Cooperation Treaty to French Patent Application Serial No. FR1871760, filed Nov. 23, 2018.

TECHNICAL FIELD

The present disclosure relates to the field of computer processing in order to generate graphical representations of digital objects. It relates more particularly to the automatic processing of the positioning on an interface of result objects obtained following a request or a processing of digital data. The objective is to generate a set of pairs of digital values comprising a proximity relationship between the objects of the set in order to form an arrangement calculated in real time to control a static or dynamic graphical representation. The disclosure relates to the field of cartographic representation using the graphical possibilities of the interface to provide additional information about the displayed objects and themes.

BACKGROUND

The graphical representations constitute hypermedia content. "Hypermedia" is a metaphor for presenting information in which text, images, sounds and actions are linked in a complex, non-sequential band of associations that allow a user to navigate relevant topics, whatever the order of the presented topics. Hypermedia derives from "hypertext," a term that was originally coined to describe text-based documents that link to other documents to form a non-sequential band of associated ideas.

An application program called a "browser" is normally used to retrieve and render hypermedia content locally or over a computer network.

Hypermedia content is commonly organized as documents having included control information. The included control information comprises formatting specifications, indicating how a document should be rendered by the web browser. In addition, such control information can comprise links or "hyperlinks": symbols or instructions indicating to the Web browser where to find other relevant WWW documents on the Internet. A hyperlink from one hypermedia topic to another is normally established by the author of a hypermedia document, although some applications allow users to insert hyperlinks to desired topics.

A hyperlink is typically rendered by a browser in the form of a graphic icon or highlighted keywords. A user "activates" or "follows" a hyperlink by clicking or otherwise selecting an icon or underlined keywords. Activating a link causes the browser to retrieve and render the document or resource that is targeted by the hyperlink or to order the performance of an action such as opening a new window, viewing an image or a video, playing a sound file, etc.

An underlying target specification is associated with the hyperlink icon or the highlighted keywords. The target specification is established in an underlying hypermedia document, but is normally invisible to the user. The target specification unambiguously identifies a targeted document or a targeted resource, typically specifying the name of the computer where the document is located and the full name of the document file. In WWW documents, targets are specified using "uniform resource locators" (also called URLs). A URL describes everything about a particular resource that a web browser needs to know in order to request and render it. The URL describes the protocol that a browser should use to retrieve the resource, the name of the computer it is on, and the path and file name of the resource.

Hypermedia content used by the WWW is commonly written using what is called a "Markup Language." A standard generalized markup language, or "SGML," is such a language, formally defined as "a document representation language which formalizes the markup and frees it from system and processing interactions." SGML is a language for describing the structure of documents and for describing a tagging scheme for delimiting this structure in a text.

To create hypermedia content, documents use a specialization of SGML called Hypertext Markup Language, or "HTML," which is presented as plain text that contains formatting instructions in the form of HTML markup codes, or "tags."

French patent FR3020162A1 is known in the state of the art, describing a method for dynamically generating interactive graphical representations of data, comprising steps of:
- constituting a structured database containing digital objects associated with variables and metadata and a process library;
- constituting a domain ontology, comprising a taxonomy of the terms of the domain, and an expression of the relationships between the terms of the domain;
- calculating a multidimensional digital representation (word cloud) as a function of the result of the distance and weighting calculation processes;
- steps of calculating a two-dimensional graphical representation of the digital objects as a function of a processing process selected from a processing process library, and at least part of the variables of the digital objects; and
- steps of recalculating the two-dimensional graphical representation as a function of the modifications imposed on the multidimensional digital representation.

European patent EP2595072 is also known, describing a computer-implemented method for storing information. The method comprises implementing, by a document repository server computer, a schema-flexible database. The method further includes receiving, by the document repository server computer, processed text information from a text analysis computer, wherein a semantic type is assigned to the processed text information. The method further comprises storing, by the document repository server computer, the processed text information in the schema-flexible database. The method further includes outputting, by the document repository server computer to an analysis computer, data selected from the processed text information stored in the schema-flexible database in response to a query received from the analysis computer.

The solutions of the prior art do not make it possible to generate hypermedia content dynamically, without knowledge of computer coding techniques or of editing tools dedicated to the production of hypermedia content. They also do not allow interactive mind maps to evolve dynamically, with a unique operating mode for viewing and using the hypermedia features of a mind map and for modifying this same mind map without exiting the viewing and operating mode.

The present disclosure provides a solution allowing the user to produce hypermedia content directly and to develop it easily and safely.

BRIEF SUMMARY

In order to address these drawbacks, the present disclosure relates in its most general sense to a method for creating interactive digital documents consisting in creating and saving an initial digital file of the HTML type, comprising a display page structure having a first graphical form and a plurality of scripts, each of which is activatable by a hypertext link, characterized in that:

A—the scripts comprise:
a multimode activation script commanding:
  i) the execution of a digital function corresponding to a main script specific to the initial digital file; and
  ii) the display of a graphical form associated with the first graphical form and of the hypertext links associated with the other scripts in the event of activation by an action of a second type;
a first other script commanding the creation and saving of an additional digital file having the same structure as that of the initial digital file;
a second other script commanding the modification of the graphic attributes of the digital file containing the second script;
a third other script commanding the deletion of the digital file containing the third script;
a fourth other script commanding the display of a text editor and the modification of the display content of the digital file containing the fourth script;
a fifth other script commanding the display of an input area of a hypertext link and the addition of the hypertext link in the display content of the digital file containing the fifth script;
a sixth script commanding the display of a zone for entering a hypertext link and saving the link associated with an identifier linked to the initial digital file containing the sixth script; and
B—in that the method comprises:
a first step of opening the initial file with a file browser in order to display the display page on the screen of a local computer; and
steps of activating one of the links and saving the resulting modifications.

Advantageously, each of the digital HTML, files FNHi has an identical structure and is associated with a unique identifier IDi saved in a digital table in relation to the name of the file FNHi, graphic attributes of the file FNHi, coordinates XYi for displaying the graphical representation associated with the file FNHi, and the identifier IDi-1 of the parent digital file FNHi-1.

Preferably, the textual contents of the digital files are saved in a digital table in relation to the identifier of the corresponding file.

The disclosure also relates to a method for viewing interactive digital maps from a set of digital files of the HTML type comprising a display page structure having a first graphical form and a plurality of scripts which are each activatable by a hypertext link, characterized in that the scripts comprise:

a multimode activation script commanding:
  i) the execution of a digital function corresponding to a main script specific to the initial digital file; and
  ii) the display of a graphical form associated with the first graphical form and of the hypertext links associated with the other scripts in the event of activation by an action of a second type;
a first other script commanding the creation and saving of an additional digital file having the same structure as that of the initial digital file;
a second other script commanding the modification of the graphic attributes of the digital file containing the second script;
a third other script commanding the deletion of the digital file containing the third script;
a fourth other script commanding the display of a text editor and the modification of the display content of the digital file containing the fourth script;
a fifth other script commanding the display of an input area of a hypertext link and the addition of the hypertext link in the display content of the digital file containing the fifth script;
a sixth script commanding the display of a zone for entering a hypertext link and saving the link associated with an identifier linked to the initial digital file containing the sixth script; and
in that the display of the digital map is executed by a computer program for dynamic calculation of a graphical representation displayable on a screen, taking into account the tables for saving the identifiers of the digital files linked to the digital map and for saving the graphic display attributes of the digital files.

BRIEF DESCRIPTION OF THE DRAWINGS

The present disclosure will be better understood on reading the description of a non-limiting embodiment of the disclosure that follows, with reference to the accompanying drawings, where:

FIG. 1 shows a schematic view of the hardware architecture;

FIG. 2 shows a schematic view of the functional architecture; and

FIG. 3 shows the flow of the actions performed by the client computer.

DETAILED DESCRIPTION

Hardware Architecture

The hardware resources implemented by the disclosure comprise a server (10) comprising several databases (11, 12) and a communication module (15) for communication with client stations (20, 30) via a local network or the Internet. The client stations (20, 30) have a communication module (1) and a computer program of the web browser type (2) which makes it possible to read the files in HTML format received from the server (10) or saved locally in a memory (21, 31) for commanding the display of the textual and/or graphic contents and for executing the functions of the file in script form, for example, in Java language.

Functional Architecture

FIG. 2 illustrates the display screen visible to the user and FIG. 3 shows the flow of the actions performed by the client computer stations (20, 30).

The initial step consists in creating a reference HTML file which constitutes the starting point of the processing operations implemented by the disclosure.

This file has the following structure:
a status: <!DOCTYPE html>.
a </html> tag corresponding to the beginning of the content which will be interpreted by the HTML page editor, up to the final <html> tag which marks the end of the content to be interpreted.
a <head> tag that delimits the header of the page and contains information that will not be displayed directly in the rendering area of the browser. For example, the title of the page, the link to a stylesheet, a description and keywords, membership in a map, etc. The header of HTML documents is the subject of the Header chapter.
a <title> tag that contains the title of the page that is displayed in the browser window.
a <body> tag that delimits the part of the file that comprises the text, links, image reference and all content.

```
- six <script> tags of type
    • <script src="file.js" type="text/javascript"></script>
    <script type="text/javascript">
    var configuration = {........
    };
    </script>
```

This file is saved in a database (11), in relation with a digital table saved in a database (12) where the identifier IDi of this file is saved, the parameter setting information Pi of the reference file for a map Ci, and the identifier of the map Ci.

The reference file contains a call to javascript commanding the display of a functional ring comprising six functional graphic zones (41 to 46) when an action exceeds a predetermined duration, and commands the display of the textual and/or graphic content of the file in the case of an action with a duration less than this predetermined duration.

When creating a new map (graphical representation resembling a mind map made up of a plurality of graphic shapes of the "bubble" type connected by connecting lines), the execution of the reference file commands the display of a screen with a graphical form (40), for example, a circle, with text corresponding to the title saved in the reference file, and possibly a comment.

The display can, for example, be commanded by the Cytoscape (trade name) software for visualization and analysis of interaction links and associated data to create graphically connected data visualizations.

This graphical form (40) is active, that is to say, an action on this form causes the execution of a computer function. The interaction may be pointing and pressing a button on a device, or user interaction with a touchscreen, on the graphical form (40) display area.

When the interaction (100) is of a first type, for example, a short "click," or a "right click" or a "tap," the browser controls the display (110) of the content of the HTML file in a "pop in"-type window and gives access to the functionalities (111) of the graphical form (40), for example, display of an image, a photograph or a video or sound sequence, or execution of a script.

When the interaction is of a second type, for example, a prolonged "click" or a repetition of "taps," the browser commands (120) the display of a ring made up of six functional graphic sectors (41 to 46) surrounding the graphical form (40), each sector (41 to 46) containing an active icon for controlling a computer function.

Optionally, in the absence of any action, the ring disappears after a predetermined time, and the display screen returns to its previous state.

Functionality of (130) for Creating a New File

An action on the sector (41) commands the execution of a script corresponds to a call saved in the reference file. The technical function (130) corresponds to the creation of a new linked bubble with the same functions (the function selection ring).

This script commands:
creating a new HTML file having the same structure as the reference file, for example, by duplicating the reference file and assigning a unique identifier;
entering a title and saving it in the new HTML file thus created;
saving (131) in the local memory (21, 31) of the host computer;
transferring the new file to the server (10) and saving it in the database (11), and saving the identifier, the title and the associated map in the database (12); and
refreshing the display with a new screen having an additional graphical form (50, 60) linked to the graphical form (40).

Functionality of (140) for Customizing the Form of the Active File

Functionality (140) corresponds to the "Settings" function of a bubble.

An action on the sector (42) commands the execution of processing consisting in displaying a screen in "pop-in" mode of an editor for customizing the color, the size or the title of the graphical representation.

The changes are saved locally in the memory (21, 31), then to send this information to the server (10) to save the modified information in the memory of the server.

Functionality of (150) for Customizing the Content of the Active File

Functionality (150) corresponds to the function for customizing the "Fields/Documents" items.

An action on the sector (43) commands the execution of processing consisting in displaying a screen in "pop-in" mode corresponding to the contents of the active HTML file and in a text editor making it possible to enter additional texts or images. The changes also concern the customization of the color, size or title of the graphical representation.

The changes are saved locally in the memory (21, 31), then this information is sent to the server (10) to save the modified information in the memory of the server.

Functionality of (160) for Deleting the Active File

Functionality (160) corresponds to the deletion of the bubble and the associated file. An action on the sector (44) commands the execution of processing consisting in deleting the HTML files linked to the active file.

This feature is only enabled for first-level files, that is to say, files linked directly to the map reference file, and it is disabled for higher-level files.

The changes are saved locally in the memory (21, 31), then this information is sent to the server (10) to save the modified information in the memory of the server.

Functionality of (170) for Customizing the Hypermedia Content of the Active File Functionality (170) corresponds to the creation of a "who" bubble with information/fields to fill in.

An action on the sector (45) commands the execution of processing consisting in displaying a screen in "pop-in" mode corresponding to the contents of the active HTML file and in a text editor making it possible to enter a hypertext link or a script in the content of the active file.

The changes are saved locally in the memory (21, 31), then this information is sent to the server (10) to save the modified information in the memory of the server.

Functionality of (180) for Creating Hypermedia Content Linked to the Active File Functionality (180) corresponds to the creation of a "link" bubble with 5 types of links as needed.

An action on the sector (46) commands the execution of processing consisting in displaying a screen in "pop-in" mode corresponding to an editor of a hypermedia link and of an associated graphical form, commanding the direct display, without going through an HTML file derived from the reference file, the activation of which commands the viewing of a video, the opening of a messaging or "chat" window, of a videoconference session or of any computer application.

The changes are saved locally in the memory (21, 31), then this information is sent to the server (10) to save the modified information in the memory of the server.

Other Features

The graphical forms can be moved on the display screen by an interaction between a pointer and the associated graphical form. In this case, the modifications of the XY coordinates of the object are saved in the local memory (21, 31) and the final coordinates are then transmitted, after the end of the movement, to the server (10) to be saved in the database (12) in relation to the identifier of the file whose graphical representation has been repositioned on the screen.

Other Characteristics

The server optionally comprises a database (13) of people. For each person, it contains an identifier IDPi, personal information, a photograph, the home page assigned to the person, the maps associated with the person and, if applicable, the associated rights concerning the use of the aforementioned functions. Activating the link associated with a person makes it possible to view information about the person, and possibly to open a link to a computer application such as Google Maps (trade name) or a messaging application.

Optionally, an input form is associated with the person and makes it possible to enter personalization information which will be saved in the database (13).

The server optionally comprises a database (14) of documents which can be imported by activating a script from an HTML file of the saved maps.

Creating a Session

In administrator mode, the administrator creates a map made up of a new space with a reference file and a list of associated people:
  for example, trainers or active users, accessing all the aforementioned functionalities;
  for example, passive users, who will only be able to access some of the functionalities.

This creation of a new map can also be ordered by duplicating an existing map and saving a replication of all the data corresponding to an existing map in a new memory space.

Viewing Calendar

The various digital elements can optionally be associated with a time indicator filtering the viewing requests to allow viewing only when the date of the request is compatible with the clock date of the server (10).

The invention claimed is:

1. A method for creating interactive digital documents comprises creating and saving an initial digital file of an HTML type, comprising a display page structure having a first graphical form and a plurality of scripts, each of which is activatable by a hypertext link, wherein:

A the plurality of scripts comprises:
  a multimode activation script commanding:
    i) execution of a digital function corresponding to a main script specific to the initial digital file;
    ii) display of a graphical form associated with the first graphical form and of the hypertext links associated with the other scripts in the event of activation by an action of a second type;
  a first other script commanding creation and saving of an additional digital file having the same structure as that of the initial digital file;
  a second other script commanding modification of graphic attributes of the digital file containing the second other script;
  a third other script commanding deletion of the digital file containing the third other script;
  a fourth other script commanding the display of a text editor and modification of display content of the digital file containing the fourth other script;
  a fifth other script commanding the display of an input area of a hypertext link and the addition of the hypertext link in the display content of the digital file containing the fifth other script;
  a sixth script commanding the display of a zone for entering a hypertext link and saving the hypertext link associated with an identifier linked to the initial digital file containing the sixth script; and B wherein the method further comprises:
  a first step of opening the initial file with a file browser in order to display the display page on a screen of a local computer; and
  steps of activating one of the hypertext links and saving resulting modifications.

2. The method of claim 1, wherein each of the digital HTML files has an identical structure and is associated with a unique identifier saved in a digital table in relation to a name of the file, graphic attributes of the file, coordinates for displaying a graphical representation associated with the file, and the unique identifier of a parent digital file.

3. The method of claim 1, wherein textual content of the digital files are saved in a digital table in relation to the identifier of a corresponding file.

4. A method for viewing interactive digital maps from a set of HTML digital files comprising a display page structure having a first graphical form and a plurality of scripts that are each activatable by a hypertext link, wherein the plurality of scripts comprise:
  a multimode activation script commanding:
    i) execution of a digital function corresponding to a main script specific to the initial digital file; and
    ii) display of a graphical form associated with the first graphical form and of the hypertext links associated with the other scripts in the event of activation by an action of a second type;
  a first other script commanding creation and saving of an additional digital file having the same structure as that of the initial digital file;
  a second other script commanding modification of the graphic attributes of the digital file containing the second script;
  a third other script commanding deletion of the digital file containing the third script;
  a fourth other script commanding the display of a text editor and modification of display content of the digital file containing the fourth script;

a fifth other script commanding the display of an input area of a hypertext link and the addition of the hypertext link in the display content of the digital file containing the fifth script;

a sixth script commanding the display of a zone for entering a hypertext link and saving the hypertext link associated with an identifier linked to the initial digital file containing the sixth script; and wherein the display of the digital map is executed by a computer program for dynamic calculation of a graphical representation displayable on a screen, taking into account tables for saving the identifiers of the digital files linked to the digital map and for saving the graphic display attributes of the digital files.

* * * * *